United States Patent
Merker

(10) Patent No.: US 7,279,015 B2
(45) Date of Patent: Oct. 9, 2007

(54) PROCESS FOR THE PRODUCING OF ELECTROLYTIC CAPACITORS

(75) Inventor: Udo Merker, Köln (DE)

(73) Assignee: H.C. Starck GmbH, Goslar (DE)

(*) Notice: Subject to any disclaimer, the term of this patent is extended or adjusted under 35 U.S.C. 154(b) by 0 days.

(21) Appl. No.: 11/106,858

(22) Filed: Apr. 15, 2005

(65) Prior Publication Data

US 2005/0248910 A1 Nov. 10, 2005

(30) Foreign Application Priority Data

May 5, 2004 (DE) .............. 10 2004 022 110

(51) Int. Cl.
*H01G 9/00* (2006.01)

(52) U.S. Cl. .............. 29/25.03; 29/25.01; 361/523; 361/525; 361/528; 361/534

(58) Field of Classification Search .............. 29/25.03, 29/25.01, 25.02; 361/523–528, 529–534, 361/512–519
See application file for complete search history.

(56) References Cited

U.S. PATENT DOCUMENTS

| | | | |
|---|---|---|---|
| 4,910,645 A | 3/1990 | Jonas et al. .............. 361/525 |
| 5,300,575 A | 4/1994 | Joans et al. .............. 525/186 |
| 5,800,857 A * | 9/1998 | Ahmad et al. .............. 427/80 |
| 5,812,367 A * | 9/1998 | Kudoh et al. .............. 361/523 |
| 5,914,852 A * | 6/1999 | Hatanaka et al. .............. 361/523 |
| 6,128,179 A * | 10/2000 | Morokuma .............. 361/517 |
| 6,154,358 A * | 11/2000 | Fukaumi et al. .............. 361/523 |
| 6,215,651 B1 * | 4/2001 | Takada et al. .............. 361/523 |
| 6,375,688 B1 * | 4/2002 | Akami et al. .............. 29/25.03 |
| 6,508,846 B2 * | 1/2003 | Yamada et al. .............. 29/25.03 |
| 6,674,635 B1 | 1/2004 | Fife et al. | |
| 6,811,576 B2 * | 11/2004 | Igaki et al. .............. 29/25.03 |
| 2002/0015279 A1 | 2/2002 | Sakai et al. | |
| 2003/0148023 A1 | 8/2003 | Sakai et al. | |

FOREIGN PATENT DOCUMENTS

| | | |
|---|---|---|
| DE | 103 24 534 | 10/2004 |
| EP | A 340 512 | 11/1989 |
| EP | A 440 957 | 8/1991 |
| JP | B 3296727 | 12/1991 |
| JP | A 2003-188052 | 7/2003 |

* cited by examiner

*Primary Examiner*—Nguyen T. Ha
(74) *Attorney, Agent, or Firm*—Norris, McLaughlin & Marcus PA

(57) ABSTRACT

Process for the production of electrolytic capacitors with low equivalent series resistance and low residual current, having a solid electrolyte formed from conducting polymers and an outer layer containing conducting polymers and a binder, electrolytic capacitors produced by the process and their use.

16 Claims, 1 Drawing Sheet

PROCESS FOR THE PRODUCING OF ELECTROLYTIC CAPACITORS

The invention relates to a process for the production of electrolytic capacitors with a low equivalent series resistance and a low leakage current, comprising a solid (solid material) electrolyte of electrically conducting polymers and an outer layer containing electrically conducting polymers and a binder, as well as the electrolytic capacitors produced by the process and their use.

BACKGROUND OF THE INVENTION

A solid electrolytic capacitor as a rule is comprised of a porous metal electrode, an oxide layer located on the metal surface, an electrically conducting solid material that is incorporated in the porous structure, an outer electrode, such as for example a silver layer, as well as further electrical contacts and an encapsulation.

Examples of solid electrolytic capacitors are tantalum, aluminum, niobium and niobium oxide capacitors with charge transfer complexes, manganese dioxide electrolytes or polymer/solid electrolytes. The use of porous bodies has the advantage that, on account of the large surface, very high capacitance densities, i.e. high electrical capacitances in a small volume, can be achieved.

On account of their high electrical conductivity π-conjugated polymers are particularly suitable as solid electrolytes. π-conjugated polymers are also termed conducting polymers or synthetic metals. They are becoming increasingly important economically since polymers have advantages over metals as regards processability, weight and the specific adjustment of properties by chemical modification. Examples of known π-conjugated polymers are polypyrroles, polythiophenes, polyanilines, polyacetylenes, polyphenylenes and poly(p-phenylene-vinylenes), a particularly important and technically used polythiophene being poly(3,4-ethylene-1,2-dioxy)thiophene, often also termed poly(3,4-ethylenedioxythiophene), since it exhibits a very high conductivity in its oxidized form.

Technical developments in electronics increasingly require solid electrolytic capacitors with a very low equivalent series resistance (ESR). The reasons for this are for example decreasingly logic circuit voltages, a higher integration density and rising clock frequencies in integrated circuits. In addition a low ESR also reduces the energy consumption, which is advantageous in particular for mobile, battery-operated uses. It is therefore desirable to reduce further as far as possible the ESR of solid electrolytic capacitors.

European patent application EP-A 340 512 (=U.S. Pat. No. 4,910,645) describes the production of a solid electrolyte from 3,4-ethylene-1,2-dioxythiophene and the use of its cationic polymer, produced by oxidative polymerization in situ, as a solid electrolyte in electrolytic capacitors. Poly(3,4-ethylenedioxythiophene) as a replacement for manganese dioxide or charge transfer complexes in solid electrolytic capacitors reduces, on account of the higher electrical conductivity, the equivalent series resistance of the capacitor and improves the frequency response.

In Japanese patent specification JP-B 3296727 a special process is described for the production of solid electrolytic capacitors. For this, a capacitor anode is impregnated in a solution of oxidizing agent and 3,4-ethylene-1,2-dioxythiophene and the mixture is then polymerized at an atmospheric humidity of greater than 70% and at a temperature between 30° C. and 50° C. The disadvantage of this process is that the films produced thereby on the outer anode surface are not sufficiently stable with respect to external stresses. The capacitors produced by this process therefore exhibit a high leakage current and high ESR values.

Apart from a low ESR modern solid electrolytic capacitors require a low leakage current and a good stability with respect to external stresses. High mechanical stresses occur in particular during the production process in the encapsulation of the capacitor anodes, which may greatly increase the leakage current of the capacitor anode.

Stability with respect to such stresses and thus a lower leakage current can be achieved in particular by a ca. 5–50 μm-thick outer layer of conducting polymers on the capacitor anode. Such a layer serves as a mechanical buffer between the capacitor anode and the electrode on the cathode side. This prevents the electrode, for example under mechanical stress, coming into direct contact with the anode or damaging the latter and thereby increasing the leakage current of the capacitor. The conducting polymeric outer layer itself exhibits a so-called self-healing ability: minor defects in the dielectric on the outer anode surface that occur despite the effect of the buffer are thereby electrically insulated, with the result that the conductivity of the outer layer at the defect site is destroyed by the electric current.

The formation of such an outer layer by means of in situ polymerization is very difficult. In this connection the layer formation requires very many coating cycles. Due to the large number of coating cycles the outer layer is very non-homogeneous, and in particular the edges of the capacitor anode are often insufficiently covered.

If oxidizing agents and monomers are applied jointly in the form of mixtures to the capacitor anode in order to produce a polymeric outer layer, then the polymeric outer layer flakes off from the capacitor anode on account of inadequate adhesion even before a sufficiently thick and homogeneous outer layer could be formed. This leads to high ESR values and high leakage currents.

Japanese patent application JP-A 2003-188052 discloses that a homogeneous edge coverage is possible by means of a sequential application of oxidizing agents and monomers as well as a complicated matching of the process parameters. This however makes the production process very expensive and complicated and susceptible to interruptions.

A compact outer layer with good edge coverage can be achieved by electrochemical polymerization. Electrochemical polymerization requires however that a conducting film is first of all deposited on the insulating oxide layer of the capacitor anode and this layer is then electrically contacted for each individual capacitor. This contacting procedure is very complicated under mass production conditions and can damage the oxide layer.

A capacitor with a compact outer layer can also be produced if the capacitor anode is first of all coated, as described for example in the patent specifications EP-A 340 512 (=U.S. Pat. No. 4,910,645) or JP-B 3296727 mentioned above, by means of in situ polymerization, following which an outer layer is produced by the application of a formulation comprising conducting polymers with binder materials. Since however conducting polymer is already deposited on the outer anode surface in the in situ polymerization, the outer layer produced from the formulation is not in direct contact with the anode surface but adheres to the in situ layer. The poor adhesion of the in situ layer to the anode surface then leads in turn to localized peeling of the outer film and thus to a higher ESR. The sole application of a well-adhering formulation of conducting polymers with binder materials without prior in situ coating is not sufficient since the conductivity of the formulation is too low to achieve a low ESR or the formulation does not penetrate the pore structure at all.

There is thus a need for a simple process for the production of solid electrolytic capacitors that are characterized by a low equivalent series resistance (ESR), a low leakage current and a compact polymer outer layer with good edge coverage.

The object was therefore to discover suitable processes by means of which such solid electrolytic capacitors can be produced.

SUMMARY OF THE INVENTION

It has now been surprisingly found that a process in which the capacitor electrodes after impregnation with mixtures containing precursors for the production of conducting polymers and oxidizing agents are exposed to a relative atmospheric humidity of greater than or equal to 70% and in which a conducting outer layer is applied to the capacitor electrodes from a solution or dispersion containing a conducting polymer and a binder, satisfies these requirements.

The present invention accordingly provides a process for the production of an electrolytic capacitor comprising the following process steps:

A) for the formation of a solid electrolyte a mixture containing precursors for the production of conducting polymers, one or more oxidizing agents and optionally counter-ions is introduced into a porous electrode body of an electrode material coated with a dielectric and optionally further layers, B) the electrode body impregnated with the mixture containing precursors for the production of conducting polymers, one or more oxidizing agents and optionally counter-ions is exposed to an atmospheric relative humidity of greater than or equal to 70%, and the precursors are polymerized to form a solid electrolyte and C) for the formation of a conducting outer layer a solution or dispersion containing at least one conducting polymer and at least one binder is applied to the porous electrode body covered with a dielectric as well as wholly or partially with a solid electrolyte and optionally further layers and then is dried.

DETAILED DESCRIPTION

The mixture containing precursors for the production of conducting polymers, one or more oxidizing agents and optionally counter-ions is hereinafter also termed "mixture" for the sake of brevity.

The step involving the introduction of the mixture into a porous electrode body coated with a dielectric and optionally further layers is understood within the scope of the invention to mean that the mixture, after application to the porous electrode body coated with a dielectric and optionally further layers, penetrates into the porous structure of the electrode body.

In principle an electrolytic capacitor is produced as follows: first of all for example a powder with a large surface area is compressed and sintered to form a porous electrode body. Metal foils may also be etched in order to obtain a porous film. The electrode body is then coated, for example by electrochemical oxidation, with a dielectric, i.e. an oxide layer. A conducting polymer that forms the solid electrolyte is deposited on the dielectric by means of oxidative polymerization.

Following this a layer containing at least one conducting polymer as well as a binder is then applied from a solution or dispersion to the outer surface of the capacitor body. Optionally further layers are applied to this polymeric outer layer. A coating containing good conducting layers, such as graphite and silver, or a metallic cathode body, serves as electrode for the discharge of the current. Finally the capacitor is contacted and encapsulated.

The electrode material forms in the electrolytic capacitor obtained by the process according to the invention preferably a porous body having a large surface area, for example in the form of a porous sintered body or a roughened film. Hereinafter this is also termed electrode body for the sake of brevity.

The electrode body covered with a dielectric is hereinafter also termed oxidized electrode body for the sake of brevity. The term "oxidized electrode body" also includes those electrode bodies that are covered with a dielectric that has not been produced by oxidation of the electrode body.

The electrode body covered with a dielectric as well as wholly or partially with a solid electrolyte is hereinafter also termed capacitor body for the sake of brevity.

The layer that is applied from a solution or dispersion containing at least one conducting polymer and a binder to the outer surface of the capacitor body is hereinafter termed polymeric outer layer.

The term "outer surface" is understood to include the outsides of the capacitor body. The polymeric outer layer is located on the whole or a part of these outer surfaces, as is shown diagrammatically and by way of example in FIGS. 1 and 2.

Figure 1:
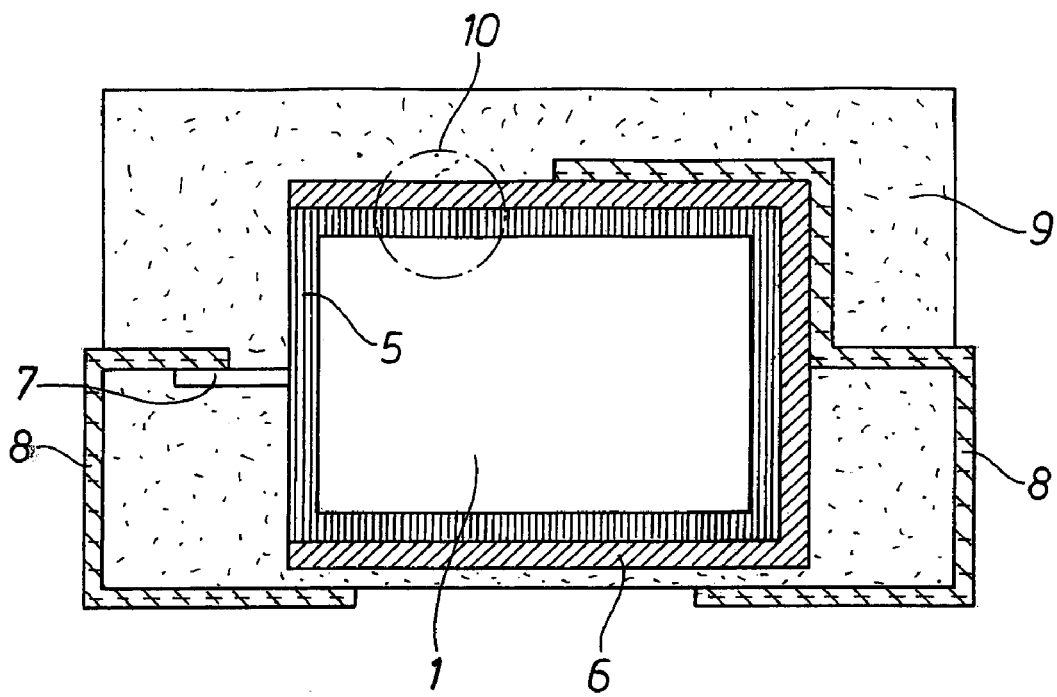
FIG. 1 is a diagrammatic representation of the structure of a solid electrolytic capacitor taking a tantalum capacitor by way of example, with 1 capacitor body
5 polymeric outer layer
6 graphite/silver layer
7 wire contact on the electrode body
8 contacts
9 encapsulation
10 section of diagram

The term polymer includes within the context of the invention all compounds containing more than one repeating unit.

Conducting polymers are understood here to denote the class of compounds of π-conjugated polymers that have an electrical conductivity after oxidation or reduction. Preferably those π-conjugated polymers that have an electrical conductivity after oxidation are understood to be conducting polymers within the meaning of the invention. By way of example there may be mentioned here polythiophenes, polypyrroles and polyanilines, which can be substituted or non substituted. Preferred conducting polymers within the meaning of the invention are optionally substituted polythiophenes, in particular optionally substituted poly(3,4-ethylenedioxy-thiophenes). Substituted means if not otherwise indicated a substitution with a substituent selected from the group of: alkyl, cycloalkyl, aryl, halogen, ether, thioether, disulfide, sulfoxide, sulfone, sulfonate, amino, aldehyde, keto, carboxylic, acid ester, carboxylic acid, carbonate, carboxylate, cyano, alkylsilane and alkoxysilane groups as well as carboxyl amide groups.

Precursors for the production of conducting polymers, hereinafter also termed precursors, are understood to include corresponding monomers or their derivatives. Mixtures of different precursors may also be used. Suitable monomeric precursors are for example optionally substituted thiophenes, pyrroles or anilines, preferably optionally substituted thiophenes, particularly preferably optionally substituted 3,4-alkylenedioxythiophenes.

As substituted 3,4-alkylenedioxythiophenes there may be mentioned by way of example the compounds of the general formulae (I), (II) or a mixture of thiophenes of the general formulae (I) and (II)

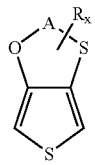

(I)

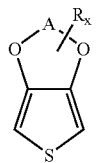

(II)

wherein
A denotes an optionally substituted $C_1$–$C_5$-alkylene radical, preferably an optionally substituted $C_1$–$C_3$-alkylene radical,
R denotes a linear or branched, optionally substituted $C_1$–$C_{18}$-alkyl, radical preferably linear or branched, optionally substituted $C_1$–$C_{14}$-alkyl radical, an optionally substituted $C_5$–$C_{12}$-cycloalkyl radical, an optionally substituted $C_6$–$C_{14}$-aryl radical, an optionally substituted $C_7$–$C_{18}$-aralkyl radical, an optionally substituted $C_1$–$C_4$-hydroxyalkyl radical, preferably optionally substituted $C_1$–$C_2$-hydroxyalkyl radical, or an hydroxyl radical,
x denotes a whole number from 0 to 8, preferably from 0 to 6, particularly preferably denotes 0 or 1, and
in the case where several radicals R are bonded to A, these may be identical or different.

Particularly preferred are polythiophenes with repeating units of the general formulae (I), (II) or repeating units of the general formulae (I) and (II), wherein A denotes an optionally substituted $C_2$–$C_3$-alkylene radical and x denotes 0 or 1.

Most particularly preferred monomeric precursors are optionally substituted 3,4-ethylenedioxythiophenes.

As substituted 3,4-ethylenedioxythiophenes there may be mentioned by way of example the compounds of the general formula (III)

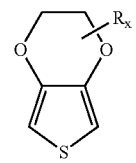

(III)

wherein R and x have the meanings given for the general formulae (I) and (II).

Within the meaning of the invention derivatives of these monomeric precursors are understood for example to denote dimers or trimers of these monomeric precursors. Higher molecular weight derivatives, i.e. tetramers, pentamers, etc. of the monomeric precursors are also possible as derivatives.

As derivatives of substituted 3,4-alkylenedioxythiophenes there may be mentioned by way of example the compounds of the general formula (IV)

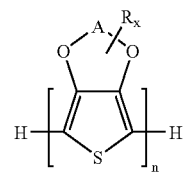

(IV)

wherein
n denotes a whole number from 2 to 20, preferably 2 to 6, particularly preferably 2 or 3, and
A, R and x have the meanings given for the general formulae (I) and (II).

The derivatives may be built up from the same as well as from different monomer units and may be used in the pure form as well as mixtures with one another and/or with the monomeric precursors. Oxidized or reduced forms of these precursors are also included within the term "precursors" within the context of the invention, provided that, in their polymerization, the same conducting polymers are formed as with the precursors listed hereinbefore.

Suitable substituents for the precursors, in particular for the thiophenes, preferably for the 3,4-alkylenedioxythiophenes, are the radicals mentioned for R in the general formulae (I) and (II).

$C_1$–$C_5$-alkylene radicals A include within the scope of the invention methylene, ethylene, n-propylene, n-butylene or n-pentylene. Within the scope of the invention $C_1$–$C_{18}$-alkyl denotes linear or branched $C_1$–$C_{18}$-alkyl radicals, such as for example methyl, ethyl, n-propyl or isopropyl, n-butyl, isobutyl, sec.-butyl or tert.-butyl, n-pentyl, 1-methylbutyl, 2-methylbutyl, 3-methylbutyl, 1-ethyl-propyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$–$C_{12}$-cycloalkyl denotes $C_5$–$C_{12}$-cycloalkyl radicals, such as for example cyclopentyl, cyclohexyl, cycloheptyl, cyclooctyl, cyclononyl or cyclodecyl, $C_5$–$C_{14}$-aryl denotes $C_5$–$C_{14}$-aryl radicals, such as for example phenyl or naphthyl, and $C_7$–$C_{18}$-aralkyl denotes $C_7$–$C_{18}$-aralkyl radicals, such as for example benzyl, o-tolyl, m-tolyl, p-tolyl, 2,3-, 2,4-, 2,5-, 2,6-, 3,4-, 3,5-xylyl or mesityl. The preceding list is given as an exemplary illustration of the invention and is not to be regarded as exhaustive.

Suitable as optionally further substituents of the $C_1$–$C_5$-alkylene radicals A are numerous organic groups, for example alkyl, cycloalkyl, aryl, halogen, ether, thioether, disulfide, sulfoxide, sulfone, sulfonate, amino, aldehyde, keto, carboxylic acid ester, carboxylic acid, carbonate, carboxylate, cyano, alkylsilane and alkoxysilane groups as well as carboxyl amide groups.

Processes for the preparation of the monomeric precursors for the production of conducting polymers as well as their derivatives are known to the person skilled in the art and are described for example in L. Groenendaal, F. Jonas, D. Freitag, H. Pielartzik & J. R. Reynolds, Adv. Mater. 12 (2000) 481–494 and the literature cited therein.

The 3,4-alkyleneoxythiophenes of the formula (I) required for the production of the polythiophenes to be used are known to the person skilled in the art or can be produced by known processes (for example according to P. Blanchard, A. Cappon, E. Levillain, Y. Nicolas, P. Frère and J. Roncali, Org. Lett. 4 (4), 2002, pp. 607–609).

The conducting polymers are formed on the electrode body covered with a dielectric by oxidative polymerization of precursors for the production of conducting polymers, in which a mixture containing the precursors, oxidizing agent, optionally counter-ions and preferably solvent is applied to the dielectric of the electrode body, the impregnated oxidized electrode body is exposed according to the invention to a relative atmospheric humidity of greater than or equal to 70% and, depending on the activity of the employed oxidizing agent, the oxidative polymerization is brought to completion by heating the coating.

As oxidizing agents there may be used all suitable metal salts known to the person skilled in the art for the oxidative polymerization of thiophenes, anilines or pyrroles.

Metal salts suitable as oxidizing agent are metal salts of main group metals or subgroup metals, the latter hereinafter also being termed transition metal salts, of the Periodic System of the Elements. Suitable transition metal salts are in particular salts of an inorganic or organic acid or of an inorganic acid comprising organic radicals, of transition metals such as for example iron(III), copper(II), chromium (VI), cerium(IV), manganese(IV) and manganese(VII) and ruthenium(III).

Preferred transition metal salts are those of iron(III). Conventional iron(III) salts are advantageously inexpensive, readily obtainable and are easy to handle, such as for example iron(III) salts of inorganic acids, such as for example iron(III) halides (e.g. $FeCl_3$) or iron(III) salts of other inorganic acids, such as $Fe(ClO_4)_3$ or $Fe_2(SO_4)$, and iron(III) salts of organic acids and of inorganic acids comprising organic radicals.

As iron(III) salts of inorganic acids comprising organic radicals, there may for example be mentioned iron(III) salts of sulfuric acid monoesters of $C_1$–$C_{20}$-alkanols, e.g. the iron(III) salt of lauryl sulfate.

Particularly preferred transition metal salts are those of an organic acid, in particular iron(III) salts of organic acids.

As iron(III) salts of organic acids, the following may for example be mentioned: iron(III) salts of $C_1$–$C_{20}$-alkanesulfonic acids, such as methanesulfonic, ethanesulfonic, propanesulfonic, butanesulfonic or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$–$C_{20}$-carboxylic acids such as 2-ethylhexylcarboxylic acid, of aliphatic perfluorocarboxylic acids such as trifluoroacetic acid or perfluorooctanoic acid, and of aromatic sulfonic acids optionally substituted by $C_1$–$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid.

Arbitrary mixtures of these aforementioned iron(III) salts of organic acids may also be used as oxidizing agent.

The use of iron(III) salts of organic acids and of inorganic acids comprising organic radicals has the great advantage that they do not have a corrosive effect.

Most particularly preferred as metal salts are iron(III) p-toluenesulfonate, iron(III) o-toluenesulfonate or a mixture of iron(III) p-toluenesulfonate and iron(III) o-toluenesulfonate.

In preferred embodiments the metal salts are treated with an ion exchanger, preferably a basic anion exchanger, before they are used. Examples of suitable ion exchangers are macroporous polymers of styrene and divinylbenzene functionalized with tertiary amines, such as are marketed for example under the trade name Lewatit® by Bayer AG, Leverkusen. The production of such metal salts treated with an ion exchanger is described in DE 103 24 534.

Further suitable oxidizing agents are peroxo compounds such as peroxodisulfates (persulfates), in particular ammonium and alkali metal peroxodisulfates, such as sodium and potassium peroxodisulfate, or alkali metal perborates—optionally in the presence of catalytic amounts of metal ions such as iron, cobalt, nickel, molybdenum or vanadium ions—as well as transition metal oxides, such as for example manganese dioxide (manganese(IV) oxide) or cerium(IV) oxide.

For the oxidative polymerization of the thiophenes of the formula (III) or (IV), there are theoretically required 2.25 equivalents of oxidizing agent per mole of thiophene (see for example J. Polym. Sc. Part A Polymer Chemistry Vol. 26, p. 1287 (1988)). Smaller or larger amounts of equivalents of oxidizing agent may however also be used. Within the context of the invention preferably one equivalent or more, particularly preferably 2 equivalents or more, of oxidizing agent is/are used per mole of thiophene.

The conducting polymers, preferably polythiophenes, contained as solid electrolyte in the electrolytic capacitors produced by the process according to the invention may be neutral or cationic. In preferred embodiments they are cationic, the term "cationic" referring only to the charges present on the polymer main chain. Depending on the substituent on the radicals R, the conducting polymers may carry positive and negative charges in the structural unit, the positive charges being located on the polymer main chain and the negative charges possibly being located on the radicals R substituted by sulfonate groups or carboxylate groups. In this connection the positive charges of the polymer main chain may be partly or completely saturated by the anionic groups possibly present on the radicals R. Overall, the conducting polymers may in these cases be regarded as cationic, neutral or even anionic. Nevertheless, within the scope of the invention they are all regarded as cationic conducting polymers since the positive charges on the polymer main chain are predominant. The positive charges can not represented in the formulae since their exact number and position cannot be established unequivocally. The number of positive charges is however at least 1 and at most n, where n is the total number of all repeating units (identical or different) within the conducting polymer, preferably polythiophene.

In order to compensate the positive charge, insofar as this is not already achieved by the radicals R optionally substituted by sulfonate or carboxylate and thus negatively charged, the cationic conducting polymers require anions as counter-ions.

In a preferred embodiment counter-ions may therefore be added to the mixtures that are incorporated in the oxidized electrode body. These may be monomeric or polymeric anions, the latter hereinafter being termed polyanions.

Polymeric anions may for example be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and polysulfonic acids may also be copolymers of vinylcarboxylic acids and vinylsulfonic acids with other polymerizable monomers, such as acrylic acid esters and styrene.

Monomeric anions are preferably used for the solid electrolytes since they more readily penetrate the oxidized electrode body.

The following may for example serve as monomeric anions: monomeric anions of $C_1$–$C_{20}$-alkanesulfonic acids, such as methanesulfonic, ethanesulfonic, propanesulfonic, butanesulfonic or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$–$C_{20}$-carboxylic acids such as 2-ethylhexylcarboxylic acid, of aliphatic perfluorocarboxylic acids such as trifluoroacetic acid or perfluorooctanoic acid, and of aromatic sulfonic acids optionally substituted by $C_1$–$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexachloroantimonates. The monomeric anions of sulfonic acids are not restricted to those of monosulfonic acids, but may also be anions of disulfonic, trisulfonic or polysulfonic acids, for example of benzenedisulfonic acid or naphthalenedisulfonic acid.

The anions of p-toluenesulfonic acid, methanesulfonic acid or camphorsulfonic acid are preferred.

The counter-anions are added to the solutions preferably in the form of their alkali metal salts or as free acids.

The possibly present anions of the oxidizing agent that is used may also serve as counter-ions, which means that it is not absolutely essential to add additional counter-ions.

Cationic polythiophenes that contain anions as counter-ions for the charge compensation are often also termed polythiophene/(poly)anion complexes in specialist circles.

Further components may also be added to the mixtures in step A) that are incorporated in the oxidized electrode bodies, such as one or more organic binders soluble in organic solvents, such as polyvinyl acetate, polycarbonate, polyvinyl-butyral, polyacrylic acid esters, polymethacrylic acid esters, polystyrene, polyacrylonitrile, polyvinyl chloride, polybutadiene, polyisoprene, polyethers, polyesters, silicones, styrene/acrylic acid ester copolymers, vinyl acetate/acrylic acid ester copolymers and ethylene/vinyl acetate copolymers, or water-soluble binders such as polyvinyl alcohols, crosslinking agents such as melamine compounds, capped isocyanates, functional silanes—e.g. tetraethoxysilane, alkoxysilane hydrolysates, e.g. based on tetraethoxysilane, epoxysilanes such as 3-glycidoxypropyl-trialkoxysilane—polyurethanes, polyacrylates or polyolefin dispersions, and/or additives such as for example surface-active substances, e.g. ionic or non-ionic surfactants or coupling agents, such as e.g. organofunctional silanes and/or their hydrolysates, e.g. 3-glycidoxypropyltrialkoxysilane, 3-aminopropyltriethoxysilane, 3-mercaptopropyl-trimethoxysilane, 3-methacryloxypropyltrimethoxysilane, vinyltrimethoxysilane and octyltriethoxysilane.

The application of the mixture in step A) to the dielectric of the electrode body may be carried out directly or by using a coupling agent, for example a silane, such as e.g. organofunctional silanes and/or their hydrolysates, e.g. 3-glycidoxypropyltrialkoxysilane, 3-amino-propyltriethoxysilane, 3-mercaptopropyltrimethoxysilane, 3-methacryloxypropyl-trimethoxysilane, vinyltrimethoxysilane or octyltriethoxysilane, and/or one or more other functional layers.

The mixtures preferably contain 1 to 30 wt. % of the precursors for the production of conducting polymers and 0 to 50 wt. % of binders, crosslinking agents and/or additives, both percentages by weight referring to the total weight of the mixture.

Particularly preferably the mixtures consist substantially of precursors, oxidizing agent and solvent.

The following organic solvents that are inert under the reaction conditions may in particular be mentioned as solvents for the precursors for the production of conducting polymers and/or oxidizing agents and/or counter-ions: aliphatic alcohols such as methanol, ethanol, i-propanol and butanol; aliphatic ketones such as acetone and methyl ethyl ketone; aliphatic carboxylic acid esters such as ethyl acetate and butyl acetate; aromatic hydrocarbons such as toluene and xylene; aliphatic hydrocarbons such as hexane, heptane and cyclohexane; chlorinated hydrocarbons such as dichloromethane and dichloroethane; aliphatic nitriles such as acetonitrile; aliphatic sulfoxides and sulfones such as dimethyl sulfoxide and sulfolane; aliphatic carboxylic acid amides such as methylacetamide, dimethylacetamide and dimethylformamide; aliphatic and araliphatic ethers such as diethyl ether and anisole. In addition water or a mixture of water with the aforementioned organic solvents may also be employed as solvent.

The oxidizing agents and precursors for the production of conducting polymers may be mixed together in solid and/or liquid form. One or more solvents is/are however preferably added to the mixtures. As suitable solvents there may be mentioned in particular the solvents already listed above. Particularly preferred as solvents are those solvents having a high vapor pressure, such as for example methanol or ethanol. Such solvents evaporate rapidly from the electrode body without heating. This has the advantage that the solvent can evaporate and precursors and oxidizing agents can settle on the inner surface of the oxidized electrode body before the polymerization starts. In this way the film properties such as conductivity and film quality, and the adhesion to the dielectric, are improved. If however the polymerization already starts in the presence of relatively large amounts of solvent, this leads to the formation of polymer particles in solution. After complete evaporation of the solvent these particles exhibit a poor adhesion to the surface of the dielectric and thus lead to a high ESR and low degrees of coverage.

Therefore in a preferred process the solvent is evaporated from the solvent containing mixture on the electrode body before the polymerization.

It is also possible to produce the mixtures directly on the surface to be coated. For this, oxidizing agents and precursors for the production of conducting polymers are added successively, preferably in the form of solutions, to the surface to be coated. The mixture is then formed by thorough mixing of the individual components, i.e. oxidizing agent and precursors, on the surface to be coated and/or optionally after partial or complete evaporation of the solvent by diffusion at the oxidizing agent/precursor interface.

The polymerization rate in mixtures containing precursors for the production of conducting polymers and at least one oxidizing agent is determined by the reaction constants of the polymerization in addition to the concentration of the educts. The reaction constants k have a temperature dependence that is given by the following equation:

$$k = \nu \times e^{-Ea/RT},$$

where $\nu$ is the frequency factor, $E_a$ is the activation energy in J/mole, R is the gas constant (8.3145 $JK^{-1}mole^{-1}$) and T is the temperature in Kelvin.

The activation energy is a temperature-independent and concentration-independent characteristic quantity for the reaction rate. A high activation energy leads to slower reactions and thus longer pot times of the mixtures. Long pot times are advantageous in industrial processes in order to achieve high material yields and low process costs.

Mixtures containing precursors for the production of conducting polymers and at least one oxidizing agent are preferred, characterized in that the polymerization of the precursors has an activation energy of 75 kJ/mole or above, preferably 85 kJ/mole or above, particularly preferably 95 kJ/mole or above. Activation energies that are too high may have the disadvantage that the polymerization commences only at very high temperatures, which is disadvantageous for the production of conducting polymers. The activation energy is therefore preferably less than 200 kJ/mole, particularly preferably less than 150 kJ/mole and most particularly preferably less than 130 kJ/mole.

The determination of activation energies as well as the procedure for carrying out the relevant kinetic measurements are known to the person skilled in the art and are described for example in "Kinetics of homogeneous multi-step reactions" by F. G. Helfferich, edited by R. G. Compton and G. Hancock as Volume 38 in the series "Comprehensive Chemical Kinetics", (Elsevier, Amsterdam 2001).

The mixture may be applied to the oxidized electrode body by known methods, e.g. by impregnation, casting, droplet application, spraying, sprinkling, knife coating, coating, spincoating or printing, for example inkjet, screen, contact or tampon printing.

It is preferred to immerse the oxidized electrode body in the mixture. In this connection the immersion and removal rate is preferably between 0.001 mm/sec and 100 mm/sec, particularly preferably between 0.01 mm/sec and 10 mm/sec.

According to the invention the impregnated oxidized electrode body is exposed to an atmospheric relative humidity of greater than or equal to 70%. These conditions may prevail during the application of the mixture and/or following the application. Preferably the oxidized electrode body is exposed to the elevated atmospheric moisture only after the application step. This has the advantage that the mixture does not absorb water from the air to an excessive extent and thus its composition does not continuously change.

Preferably the exposure to an elevated atmospheric humidity according to process step B) takes place for a time ranging from 1 second up to 24 hours, preferably 30 seconds to 2 hours, particularly preferably 1 minute to 30 minutes. This may take place for example in a climatic chamber. The relative humidity is in this connection greater than or equal to 70%, preferably greater than or equal to 80%, particularly preferably greater than or equal to 90%. The temperature during the exposure to elevated atmospheric relative humidity is preferably less than 30° C., particularly preferably between 1° and 30° C. and most particularly preferably between 10° and 30° C. In preferred embodiments the temperature during the exposure to elevated atmospheric humidity is 15° to 25° C.

Following the exposure to elevated atmospheric humidity a thermal post-treatment is preferably carried out for the further polymerization, at temperatures from −10° to 300° C., preferably 10° to 200° C., particularly preferably 30° to 150° C. The duration of the heat treatment depends on the nature of the polymer used for the coating and ranges from 5 seconds up to several hours. Temperature profiles with different temperatures and residence times may also be used for the thermal treatment.

The heat treatment may for example be effected by moving the coated oxidized electrode bodies at such a rate through a heated chamber at the desired temperature that the desired residence time at the chosen temperature is achieved, or alternatively the electrode body is brought into contact with a hotplate at the desired temperature for the desired residence time. In addition, the heat treatment may for example be carried out in a heated furnace or a plurality of heated furnaces each at different temperatures.

After the exposure to an elevated atmospheric humidity and optionally after the thermal post-treatment it may be advantageous to wash out the excess oxidizing agent and residual salts from the coating using a suitable solvent, preferably water or alcohols. Residual salts are understood in this connection to mean the reduced forms of the oxidizing agent and possibly further salts that may be present.

For metal oxide dielectrics, such as for example oxides of valve metals, it may be advantageous after the exposure to elevated atmospheric humidity and possibly after a thermal post-treatment and preferably during or after the wash stage to treat the oxide film electrochemically in order to rectify possible defects in the said oxide film and thereby reduce the residual current of the finished capacitor. In this so-called reforming the capacitor body is immersed in an electrolyte and a positive voltage is applied with positive potential to the electrode body. The electric current, which flows from the electrode body over defective sites in the oxide film to the conductive polymer, reforms the oxide film at these sites or destroys the conductivity of the conductive polymer at these defective sites.

Depending on the nature of the oxidized electrode body it may be advantageous to impregnate the oxidized electrode body before and/or after a wash procedure several further times with the mixtures of precursors for the production of conductive polymers and oxidizing agents in order to achieve thicker polymer layers in the interior of the electrode body. The compositions of the mixtures may in this connection vary. The solid electrolyte may optionally be composed of a multilayer system that comprises a plurality of functional layers.

The degree of coverage of the surface of the dielectric by the solid electrolyte is preferably greater than 50%, particularly preferably greater than 70% and most particularly preferably greater than 80%.

Within the scope of the present invention the coverage of the dielectric with the solid electrolyte is determined as follows: the capacitance of the capacitor is measured in both the dry and wet state at 120 Hz. The degree of coverage is the ratio of the capacitance in the dry state to the capacitance in the wet state, expressed as a percentage. Dry state means that the capacitor has been dried for several hours at elevated temperature (80°–120° C.) before measurements are made.

Wet state means that the capacitor is exposed for several hours to a saturated atmospheric humidity at elevated pressure, for example in a vapor pressure vessel. The moisture thereby penetrates into pores that are not covered by the solid electrolyte and acts there as liquid electrolyte.

It was surprisingly found that the process according to the invention described above suppresses the polymerization on the outer surface of the oxidized electrode body. Accordingly it is now possible to coat the interior of the electrode body sufficiently with a conducting polymer without at the same time producing a poorly adherent outer film even with multiple impregnations and polymerizations. After the internal coating according to steps A)+B) the solution or dispersion containing at least one conducting polymer and a binder can thus be applied directly to the outer surface of the oxidized electrode body. The direct contact of the binder with the outer surface leads to a good adhesion of the polymeric outer film on the oxidized electrode body.

After production of the solid electrolyte and optionally after application of further layers e.g. other types of conductive layers to the capacitor body, according to the invention a solution or dispersion containing at least one conducting polymer and a binder is therefore applied to the capacitor body for the production of a polymeric outer layer.

The conducting polymers in the solution or dispersion can be produced from the precursors for the production of the solid electrolyte described above. Preferred ranges, definitions and examples of precursors listed hereinbefore apply similarly in appropriate combination to the conducting polymers in the solution or dispersion.

Preferred conducting polymers in the solution or dispersion are optionally substituted polythiophenes, pyrroles and/or anilines.

Particularly preferred as conducting polymer in the solution or dispersion is an optionally substituted polythiophene with repeating units of the general formulae (V) or (VI) or repeating units of the general formulae (V) and (VI),

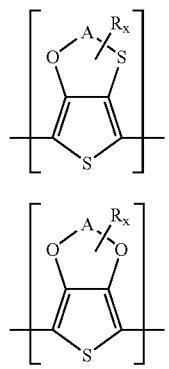

wherein
A denotes an optionally substituted $C_1$–$C_5$-alkylene radical,
R denotes a linear or branched, optionally substituted $C_1$–$C_{18}$-alkyl radical, an optionally substituted $C_5$–$C_{12}$-cycloalkyl radical, an optionally substituted $C_6$–$C_{14}$-aryl radical, an optionally substituted $C_7$–$C_{18}$-aralkyl radical, an optionally substituted $C_1$–$C_4$-hydroxyalkyl radical or a hydroxyl radical,
x denotes a whole number from 0 to 8 and in the case where several radicals R are bonded to A, these may be identical or different.

The general formulae (V) and (VI) are to be understood as meaning that the substituent R may be bonded x times to the alkylene radical A. That is to say, there may be "x" radicals R bound to A.

Poly-3,4-ethylenedioxythiophene is most particularly preferred as conducting polymer in the solution or dispersion.

For the polythiophenes with repeating units of the general formulae (V) or (VI) or repeating units of the general formulae (V) and (VI) that are contained in the polymeric outer layer, the definitions for preferred radicals A and R and for x made hereinbefore in connection with the precursors apply. Preferred ranges similarly apply in arbitrary combinations.

Within the context of the present invention the prefix "poly" is understood to mean that more than one identical or different repeating unit is contained in the polymer or polythiophene. The polythiophenes contain a total of n repeating units of the general formulae (V) or (VI) or of the general formulae (V) and (VI), where n is a whole number from 2 to 2000, preferably 2 to 100. The repeating units of the general formulae (V) and/or (VI) may in each case be identical or different within a polythiophene. Preferred are polythiophenes having in each case identical repeating units of the general formulae (V), (VI) or (V) and (VI).

The polythiophenes preferably in each case carry H at the terminal groups.

Monomeric and/or polymeric anions may preferably function as counter-ions for the conducting polymers in step C). Suitable counter-ions are the counter-ions already mentioned hereinbefore for the mixtures. Preferred ranges apply similarly in arbitrary combinations.

A polymeric anion preferably serves as counter-ion.

Polymeric anions may for example be anions of polymeric carboxylic acids such as polyacrylic acids, polymethacrylic acids or polymaleic acids, or polymeric sulfonic acids such as polystyrenesulfonic acids and polyvinylsulfonic acids. These polycarboxylic acids and polysulfonic acids may also be copolymers of vinylcarboxylic acids and vinylsulfonic acids with other polymerisable monomers such as acrylic acid esters and styrene.

An anion of a polymeric carboxylic acid or sulfonic acid is preferred as polymeric anion.

Particularly preferred as polymeric anion is the anion of polystyrenesulfonic acid (PSS).

The molecular weight of the polyacids supplying the polyanions is preferably 1000 to 2,000,000, particularly preferably 2000 to 500,000. The polyacids or their alkali metal salts are commercially available, for example polystyrenesulfonic acids and polyacrylic acids, or can be obtained by known processes (see for example Houben Weyl, Methoden der organischen Chemie, Vol. E 20 Malkromolekulare Stoffe, Part 2, (1987) p. 1141 ff).

Polymeric anion(s) and conducting polymers may be contained in the solution or dispersion in a weight ratio of 0.5:1 to 50:1, preferably 1:1 to 30:1, particularly preferably 2:1 to 20:1, in each case referred to the weight after drying the solution or dispersion. The weight of the conducting polymers corresponds in this connection to the weighed-out amount of the employed monomers, assuming that a complete conversion occurs in the polymerization.

The solutions and dispersions in step C) preferably may also contain at least one solvent. Suitable solvents are the solvents already mentioned hereinbefore for the precursors. Preferred solvents are water or other protic solvents such as alcohols, e.g. methanol, ethanol, i-propanol and butanol, as well as mixtures of water with these alcohols. Water is particularly preferred as solvent.

The solution or dispersion for the production of the polymeric outer layer preferably contains at least one polymeric organic binder. Suitable polymeric organic binders include for example polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester copolymers, vinyl acetate/acrylic acid ester copolymers and ethylene/vinyl acetate copolymers, polybutadienes, polyisoprenes, polystyrenes, polyethers, polyesters, polycarbonates, polyurethanes, polyamides, polyimides, polysulfones, melamine-formaldehyde resins, epoxide resins, silicone resins or celluloses. Also suitable within the scope of the present invention as polymeric organic binders are those binders produced by addition of crosslinking agents such as for example melamine compounds, capped isocyanates or functional silanes, such as e.g. 3-glycidoxypropyltrialkoxysilane, tetraethoxysilane and tetraethoxysilane hydrolysate, or crosslinkable polymers such as e.g. polyurethanes, polyacrylates or polyolefins, followed by crosslinking. Such crosslinking products suitable as polymeric binder may also be formed for example by reaction of the added crosslinking agents with added polymeric anions. In this case the crosslinked polyanion in the polymeric outer layer then performs the function of a polymeric anion as well as the function of the binder. Capacitors containing such crosslinked polyanions are also understood as capacitors within the context of the present invention. Preferred are those binders that have a sufficient temperature stability in order to withstand the temperature stresses to which the finished capacitors are subsequently subjected, e.g. soldering temperatures from 220° to 260° C.

The amount of polymeric binder in the solution or dispersion, referred to the composition after drying the solution or dispersion, is 1–90%, preferably 5–80% and most particularly preferably 20–60%.

The addition of binders has the great advantage that the adhesion of the outer polymer layer to the capacitance body is improved. Furthermore the binder increases the solids fraction in the dispersion, so that a sufficient outer layer thickness can already be achieved with an impregnation and the edge coverage is significantly improved.

The solution or dispersion containing at least one conducting polymer and a binder according to step C) may in addition contain further components such as surface-active substances, e.g. ionic and non-ionic surfactants or coupling agents, such as e.g. organofunctional silanes or their hydrolysates, e.g. 3-glycidoxypropyltrialkoxysilane, 3-aminopropyl-triethoxysilane, 3-mercaptopropyltrimethoxysilane, 3-methacryloxypropyltri-methoxysilane, vinyltrimethoxysilane or octyltri-ethoxysilane.

Preferably the solutions and dispersions according to step C) contain further additives that improve the conductivity, such as for example compounds containing ether groups such as e.g. tetrahydrofuran, compounds containing lactone groups such as γ-butyrylactone, γ-valerolactone, compounds containing amide or lactam groups such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulfones and sulfoxides, such as e.g. sulfolane (tetramethylenesulfone), dimethyl sulfoxide (DMSO), sugars or sugar derivatives, such as e.g. sucrose, glucose, fructose, lactose, sugar alcohols such as e.g. sorbitol, mannitol, furan derivatives such as e.g. 2-furancarboxylic acid, 3-furancarboxylic acid and/or dialcohols or polyalcohols such as e.g. ethylene glycol, glycerol, diethylene glycol and triethylene glycol. Tetrahydrofuran, N-methylformamide, N-methylpyrrolidone, dimethyl sulfoxide or sorbitol are particularly preferably used as conductivity-raising additives.

The production of the solutions or dispersions is carried out for example from mixtures containing precursors and oxidizing agents. The production of dispersions from optionally substituted anilines, thiophenes of the general formulae (I), (II) or mixtures of thiophenes of the general formulae (I) and (II) is carried out for example under conditions similar to those mentioned in EP-A 440 957. Suitable oxidizing agents, solvents and monomeric or polymeric anions are those already mentioned hereinbefore.

Also possible is a production of a polyaniline/polyanion or polythiophene/polyanion complex and subsequent dispersion or re-dispersion in one or more solvents.

The solutions or dispersions are applied to the capacitor body by known methods, e.g. by spincoating, impregnation, casting, droplet application, spraying, sprinkling, knife coating, coating or printing, for example inkjet, screen or tampon printing.

Preferably solutions or dispersions containing at least one conducting polymer and a binder are used that in the dry state have a specific conductivity of greater than 10 S/cm, particularly preferably greater than 20 S/cm, most particularly preferably greater than 50 S/cm and above all preferably greater than 100 S/cm.

The application of the polymeric outer layer may also be followed by drying, cleaning of the layer by washing, re-forming and repeated applications—as already described hereinbefore for the production of the solid electrolyte. Depending on the binder or crosslinking agent that is employed, further treatment steps such as for example curing or crosslinking by temperature or light may also be used. In addition further layers may be applied to the polymeric outer layer.

The thickness of the polymeric outer layer is 1–1000 µm, preferably 1–100 µm, particularly preferably 2–50 µm and most particularly preferably 4–20 µm. The layer thickness may vary over the outer surface. In particular the layer thickness at the edges of the capacitor body may be greater or less than on the side faces of the capacitor body. A virtually homogeneous layer thickness is preferred.

The polymeric outer layer may as regards its composition have a homogeneous or non-homogeneous distribution with respect to the binders, conducting polymers and polymeric anions. Homogeneous distributions are preferred.

The polymeric outer layer may be a constituent of a multilayer system comprising several functional layers that forms the outer layer of the capacitor body. Further functional layers may also be provided on the polymeric outer layer. In addition several polymeric outer layers may be provided on the capacitor body.

Figure 2:
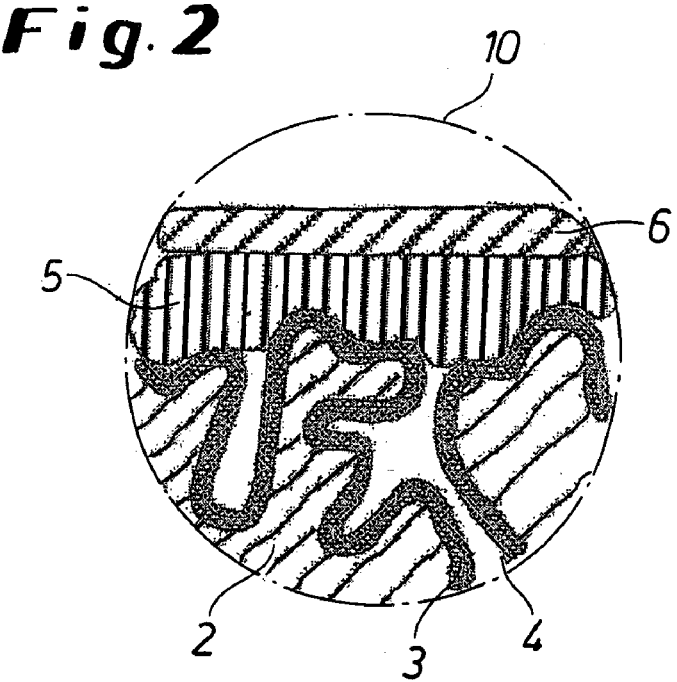
FIG. 2 shows by way of an enlarged section of diagram 10 of FIG. 1 the diagrammatic layer structure of the tantalum capacitor, with 10 section of diagram
2 porous electrode body
3 dielectric
4 solid electrolyte
5 polymeric outer layer
6 graphite/silver layer Within the scope of the invention the definitions, subsidiary definitions, parameters and explanations given hereinafter in general terms or in preferred ranges may also be combined arbitrarily with one another, i.e. also between the respective ranges and preferred ranges.

Preferably the polymeric outer layer is located directly, without further intermediate layers, on the outer surface of the capacitor body. The polymeric outer layer preferably penetrates the edge region of the capacitor body in order to produce a good electrical contact with the solid electrolyte and improve the adhesion to the capacitor body (see for example FIG. 2).

In a particularly preferred embodiment the electrolytic capacitor according to the invention contains a solid electrolyte containing poly(3,4-ethylenedioxythiophene) (PEDT) and a polymeric outer layer containing polystyrenesulfonic acid (PSS) and poly(3,4-ethylenedioxythiophene), the latter also frequently being termed PEDT/PSS or PEDOT/PSS in the literature.

In a most particularly preferred embodiment the electrolytic capacitor according to the invention contains a solid electrolyte of poly(3,4-ethylenedioxy-thiophene) and monomeric counter-ions, and a polymeric outer layer of PEDT/PSS and a binder.

In a further preferred embodiment of the process according to the invention for the production of electrolytic capacitors, the electrode material is a valve metal or a compound having comparable electrical properties to a valve metal.

Valve metals are understood within the scope of the invention to denote those metals whose oxide layers do not permit current to flow equally in both directions. When a voltage is applied to the anode the oxide layers of the valve metals prevent the flow of current, whereas when a voltage is applied to the cathode large currents flow that can destroy the oxide layer. Valve metals include Be, Mg, Al, Ge, Si, Sn, Sb, Bi, Ti, Zr, Hf, V, Nb, Ta and W as well as an alloy or compound of at least one of these metals with other elements. The best known examples of valve metals are Al, Ta and Nb. Compounds with comparable properties are those exhibiting metallic conductivity that can be oxidized and whose oxide layers have the properties described hereinbefore. For example NbO exhibits metallic conductivity, but is generally not regarded as a valve metal. Layers of oxidized NbO however exhibit the typical properties of valve metal oxide layers, so that NbO or an alloy or compound of NbO with other elements are typical examples of such compounds with comparable properties.

Consequently the term "oxidizable metal" covers not only metals but also an alloy or compound of a metal with other elements, provided that they exhibit metallic conductivity and can be oxidized.

The present invention accordingly particularly preferably provides a process for the production of electrolytic capacitors, which is characterized in that the valve metal or the compound with comparable properties is tantalum, niobium, aluminum, titanium, zirconium, hafnium, vanadium, an alloy or compound of at least one of these metals with other elements, NbO or an alloy or compound of NbO with other elements.

The dielectric preferably consists of an oxide of the electrode material or—in the case where this is already an oxide—of a higher oxidized form of the electrode material. The dielectric optionally contains further elements and/or compounds.

The oxidizable metals are for example sintered in powder form to form a porous electrode body or a porous structure is impressed on a metallic body. The latter procedure may be carried out for example by etching a film.

The porous electrode bodies are for example oxidized in a suitable electrolyte, such as for example phosphoric acid, by applying a voltage. The magnitude of this forming voltage depends on the oxide layer thickness to be achieved or on the subsequent application voltage of the capacitor. Preferred voltages are 1 to 300 V, particularly preferably 1 to 80 V.

For the production of the electrode body there are preferably used metal powders with a specific charge of greater than 35000 µC/g, particularly preferably with a specific charge greater than 45000 µC/g, more particularly preferably with a specific charge greater than 65000 µC/g, and most particularly preferably with a specific charge greater than 95000 µC/g. In preferred embodiments of the process according to the invention metal powders are used having a specific charge of greater than 140000 µC/g.

The specific charge of the metal powders is calculated as follows:

$$\text{specific charge} = (\text{capacitance} \times \text{voltage})/\text{weight of the oxidized electrode body}.$$

The capacitance is calculated in this connection from the capacitance of the oxidized electrode body measured at 120 Hz in an aqueous electrolyte. The electrical conductivity of the electrolyte is sufficiently large so that, at 120 Hz, there is still no drop in capacitance on account of the electrical resistance of the electrolyte. 18% aqueous sulfuric acid electrolytes are for example used for the measurement. The voltage in the above formula corresponds to the maximum forming voltage (oxidation voltage).

The electrolytic capacitors produced by the process according to the invention are, on account of their low residual current and their low ESR, eminently suitable as a component in electronic circuits. Preferred are digital electronic circuits such as are used for example in computers (desktop, laptop, servers), in portable electronic devices such as e.g. mobile phones and digital cameras, in equipment used in consumer/entertainment electronics, such as for example in CD/DVD players and computer game consoles, in navigation systems and in telecommunications equipment.

The present invention accordingly also provides electrolytic capacitors produced by the process according to the invention, as well as the use of these electrolytic capacitors in electronic circuits.

Preferred are electrolytic capacitors that have a specific charge greater than 5000 µC/g, particularly preferably greater than 15000 µC/g, more particularly preferably greater than 30000 µC/g, and most particularly preferably greater than 40000 µC/g, referred to the weight of the electrode body coated with a dielectric.

The specific charge of the electrolytic capacitor is calculated as follows:

$$\text{specific charge} = (\text{capacitance} \times \text{voltage})/\text{weight of the oxidized electrode body}.$$

The capacitance is calculated in this connection from the capacitance of the electrolytic capacitor measured at 120 Hz and the voltage is the operating voltage of the capacitor (rated voltage). The weight of the oxidized electrode body refers to the pure weight of the porous electrode material coated with dielectric, excluding polymer, contacts and encapsulations.

Preferred are electrolytic capacitors that have an ESR measured at 100 kHz of less than 51 mΩ. Particularly preferably the ESR of the electrolytic capacitors according to the invention, which is measured at a frequency of 100 kHz, is less than 31 mΩ, more particularly preferably less than 21 mΩ, and most particularly preferably less than 16 mΩ. In particularly preferred embodiments of the electrolytic capacitors according to the invention the ESR is less than 11 mΩ.

The equivalent series resistance of a solid electrolytic capacitor is inversely related to the geometric surface of the capacitor. The product of the equivalent series resistance and the geometric surface therefore provides a quantity that is independent of the structural size.

The expression geometric surface is understood hereinafter to denote the outer surface of the capacitor body, which is calculated from the geometric dimensions. For cuboid sintered bodies the geometric surface is accordingly:

$$\text{geometric surface} = 2(L \times B + L \times H + B \times H),$$

where L denotes the length, B the width and H the height of the body and × is the multiplication symbol. In this connection only that part of the capacitor body on which the polymeric outer layer is located is taken into account.

If a plurality of capacitor bodies are used in a capacitor, then the individual geometric surfaces are summated to form an overall geometric surface.

For solid electrolytic capacitors that contain for example a wound sheet as porous electrode body, the dimensions of the unwound sheet (length, width) are used as measurement.

Also preferred therefore are electrolytic capacitors in which the equivalent series resistance measured at 100 kHz multiplied by the geometric surface of the capacitor body is less than 4000 mΩmm$^2$. Particularly preferably the equivalent series resistance multiplied by the geometric surface is less than 3000 mΩmm$^2$, more particularly preferably is less than 2000 mΩmm$^2$, and most particularly preferably less than 1000 mΩmm$^2$. In particularly preferred embodiments of the electrolytic capacitors according to the invention the equivalent series resistance multiplied by the geometric surface is less than 600 mΩmm$^2$.

The examples given hereinafter should not be regarded as restrictive.

EXAMPLES

EXAMPLE 1

1. Production of Oxidized Electrode Bodies

Tantalum powder having a specific capacitance of 50,000 µFV/g was compressed into pellets and sintered in order to form a porous electrode body of dimension 4.2 m×3 mm×1.6 mm. The pellets (anode pellets) were anodized at 30 V in a phosphoric acid electrolyte.

2. Chemical in situ Coating According to the Invention of the Anode Pellets

A solution was prepared consisting of 1 part by weight of 3,4-ethylenedioxythiophene (BAYTRON® M, H.C. Starck GmbH) and 20 parts by weight of a 40 wt. % ethanolic solution of iron(III) p-toluenesulfonate (BAYTRON® C-E, H. C. Starck GmbH).

The solution was used to impregnate the anode pellets. The anode pellets were immersed in this solution and then exposed for 30 minutes at room temperature (20° C.) to an atmospheric relative humidity of 95%. Following this they were heat treated for 15 minutes at 50° C. and for 15 minutes at 150° C. in a drying cabinet. The pellets were then washed for 30 minutes in an aqueous 2% solution of p-toluenesulfonic acid. The anode pellets were re-formed for 30 minutes in a 0.25 wt. % aqueous solution of p-toluenesulfonic acid, and then rinsed in distilled water and dried. The aforedescribed impregnation, drying, temperature treatment and re-forming were repeated a further four times.

Comparison Example 1

Coated anode pellets were produced similarly to Example 1, except that after the impregnation the pellets were exposed for 30 minutes at room temperature (20° C.) to an atmospheric relative humidity of only 50%.

The anode pellets from Example 1 exhibited no visible outer polymer film. On the anode pellets from comparison example 1 however a clearly visible outer polymer film had formed that exhibited cracks and exfoliations.

Example 1 shows that the exposure according to the invention of the anode pellets impregnated with precursors and oxidizing agents to elevated atmospheric humidity suppresses the polymerization on the outer anode surface, even if followed by a heat treatment at elevated temperature. On the other hand, in the comparison example an outer polymer film is formed that has a poor adhesion to the anode surface.

EXAMPLE 2

Production of Capacitors According to the Invention

1. Production of Oxidized Electrode Bodies

Tantalum powder having a specific capacitance of 50,000 µFV/g was compressed into pellets and sintered in order to form a porous electrode body of dimension 4.2 mm×3 mm×1.6 mm. The pellets (anode pellets) were anodized at 30 V in a phosphoric acid electrolyte.

2. Chemical in situ Coating of the Anode Pellets

A solution was prepared consisting of 1 part by weight of 3,4-ethylenedioxythiophene (BAYTRON® M, H.C. Starck GmbH) and 20 parts by weight of a 40 wt. % ethanolic solution of iron(III) p-toluenesulfonate (BAYTRON® C-E, H.C. Starck GmbH).

The solution was used to impregnate 7 anode pellets. The anode pellets were immersed in this solution and then exposed for 30 minutes at room temperature (20° C.) to a relative atmospheric humidity of 95%. Following this they were heat treated for 15 minutes at 50° C. and for 15 minutes at 150° C. in a drying cabinet. The pellets were then washed for 30 minutes in an aqueous 2% solution of p-toluenesulfonic acid. The anode pellets were re-formed for 30 minutes in a 0.25 wt. % aqueous solution of p-toluenesulfonic acid, and then rinsed in distilled water and dried. The aforedescribed impregnation, drying, temperature treatment and re-forming were repeated a further two times.

3. Application of a Polymeric Outer Layer

The anode pellets were then impregnated in an aqueous dispersion consisting of 90 parts of an aqueous PEDT/PSS dispersion (BAYTRON® P, H.C. Starck GmbH), 4 parts of DMSO, 4.2 parts of a sulfonated polyester (Eastek® 1400, solids content 30 wt. % in water, Eastman) and 0.2 part of surfactant (Zonyl® FS 300, Du Point) and dried for 15 minutes at 80° C.

The pellets were then coated with a graphite and silver layer.

Comparison Example 2

7 capacitors were fabricated similarly to Example 2, except that after the impregnation the capacitors were exposed for 30 minutes at room temperature (20° C.) to an atmospheric relative humidity of only 50%.

The capacitors had on average the following electrical values:

|  | Example 2<br>95% relative<br>atmospheric humidity | Comparison example 2<br>50% relative<br>atmospheric humidity |
| --- | --- | --- |
| Capacitance 120 Hz | 137 µF | 126 µF |
| Capacitance 100 Hz | 107 µF | 68 µF |
| ESR at 10 kHz | 28 mΩ | 50 mΩ |
| ESR at 100 kHz | 23 mΩ | 28 mΩ |

The capacitance was determined at 120 Hz and 100 kHz and the equivalent series resistance (ESR) was determined at 10 kHz and at 100 kHz by means of an LCR meter (Agilent 4284A).

The capacitors of Example 2 produced according to the invention, which were exposed to a relative atmospheric humidity of 95%, exhibit significantly better electrical properties than the capacitors of comparison example 2, which were exposed to an atmospheric relative humidity of 50%.

The capacitors produced according to the invention have a stable ESR in the frequency range from 10 kHz to 100 kHz. The ESR at 10 kHz is only 5 mΩ higher than at 100 kHz. It therefore follows that even at high frequencies of 100 kHz, almost 80% of the capacitance is still available. On the other hand the capacitors from the comparison example exhibit a sharp rise in ESR at lower frequencies. The ESR value at 10 kHz is 22 mΩ higher than at 100 kHz. At the same time the capacitance of these capacitors at 100 kHz is roughly half the value at 120 Hz. The reason for this poor frequency response of the comparison capacitors is the poor adhesion of the outer polymer layer to the capacitor body. The good adhesion of the binder to the capacitor body does not come into play since an in situ-polymerized layer that does not exhibit a good adhesion to the capacitor body still exists between the said capacitor body and the binder-containing polymer layer.

EXAMPLE 3.1

Production of Capacitors According to the Invention 7 capacitors were fabricated similarly to Example 2, except that the anode pellets after the impregnation and the 15-minute exposure to an atmospheric relative humidity of 95% at 20° C. were then heat treated for 30 minutes at 50° C.

EXAMPLE 3.2

7 capacitors were fabricated similarly to Example 3.1, except that the anode pellets after the impregnation were exposed for 15 minutes to an atmospheric relative humidity of 95% at 40° C.

The capacitors had the following average electrical values:

|  | Example 3.1 95% relative atmospheric humidity 20° C. | Comparison example 3.2 95% relative atmospheric humidity 40° C. |
| --- | --- | --- |
| Capacitance 120 Hz | 119 µF | 74 µF |
| Capacitance 100 Hz | 89 µF | 47 µF |
| ESR at 10 kHz | 30 mΩ | 54 mΩ |
| ESR at 100 kHz | 22 mΩ | 30 mΩ |

The capacitance was determined at 120 Hz and 100 kHz and the equivalent series resistance (ESR) was determined at 10 kHz and at 100 kHz by means of an LCR meter (Agilent 4284A).

The capacitors of Example 3.1 produced according to the invention, which were exposed to a relative atmospheric humidity of 95% at 20° C., exhibit a significantly higher capacitance and a lower ESR at both 10 kHz and at 100 kHz. The capacitors of Example 3.1 thus exhibit even better electrical properties than the capacitors of Example 3.2, which were exposed to an atmospheric relative humidity of 95% at 40° C.

Lower temperatures, preferably less than 30° C. during the exposure to an elevated atmospheric humidity, as in Example 3.1, lead to a lower ESR and a high capacitance.

EXAMPLE 4

Production of Capacitors According to the Invention 6 capacitors were fabricated similarly to Example 2.

Comparison Example 4

6 capacitors were fabricated similarly to Example 2, without however the application of a polymeric outer layer.

The capacitors of Example 4 had on average a residual current of 0.9 µA at 10 V operating voltage. The capacitors of comparison example 4 without a polymeric outer layer were all short circuited at 10 V.

Example 4 and comparison example 4 show that in the process according to the invention the application of a polymeric outer layer is essential for producing capacitors having low residual currents.

I claim:

1. Process for the production of an electrolytic capacitor comprising at least the following process steps:
   A) introducing a mixture containing precursors for the production of conducting polymers, one or more oxidizing agents and optionally counter-ions into a porous electrode body of an electrode material coated with a dielectric and optionally further layers, to impregnate said porous electrode body with said mixture,
   B) exposing the electrode body impregnated with said mixture to an atmospheric relative humidity of greater than or equal to 70% and polymerizing said precursors to form a solid electrolyte, and
   C) applying a solution or dispersion containing at least one conducting polymer and at least one binder to the porous electrode body and then drying.

2. Process according to claim 1, wherein step B) is carried out at a temperature of less than 30° C.

3. Process according to claim 1, wherein said precursors are selected from the group consisting of optionally substituted thiophenes, pyrroles and anilines.

4. Process according to claim 3, wherein said optionally substituted thiophene is 3,4-ethylenedioxy-thiophene.

5. Process according to claim 1, wherein said oxidizing agents are selected from the group consisting of alkali metal or ammonium peroxodisulfates, hydrogen peroxide, alkali metal perborates, iron(III) salts of organic acids, iron(III) salts of inorganic acids and iron(III) salts of inorganic acids that comprise organic radicals.

6. Process according to claim 1, wherein said counter-ions are selected from the group consisting of anions of monomeric alkanesulfonic acids, anions of cycloalkanesulfonic acids and anions of aromatic sulfonic acids.

7. Process according to claim 1, wherein said mixture employed in A) has an activation energy of 75 k/Jmole or above for the polymerization.

8. Process according to claim 1, wherein the solution or dispersion applied in C) as conducting polymer contains optionally substituted polythiophenes, polypyrroles and/or polyanilines.

9. Process according to claim 8, wherein said optionally substituted polythiophene is poly(3,4-ethylenediox-ythiophene).

10. Process according to claim 1, wherein the electrode material is a valve metal or a compound having comperable properties of metallic conductivity and which is oxidizable to form an oxide layer which does not permit current to flow equally in both directions.

11. Process according to claim 10, wherein the valve metal or the compound is selected from the group consisting of tantalum, niobium, aluminum, titanium, zirconium, hafnium, vanadium, alloys or compounds of these metals with other elements, NbO and alloys or compounds of NbO with other elements.

12. Process according to claim 10, wherein the dielectric is an oxide of the valve metal or an oxide of the compound having comparable properties.

13. Process according to claim 1, wherein the mixture of step A) further comprises a solvent and that the solvent is evaporated from the mixture on the electrode body before the polymerization of the precursors.

14. Electrolytic capacitors produced by the process of claim 1.

15. Electrolytic capacitor according to claim 14, having a specific charge of greater than 5000 μC/g, based on the weight of the electrode body coated with a dielectric.

16. An electronic circuit comprising the electrolytic capacitor of claim 14.

* * * * *